US012547507B1

(12) United States Patent  
Goren

(10) Patent No.: US 12,547,507 B1
(45) Date of Patent: Feb. 10, 2026

(54) SYNCHRONIZED SNAPSHOT IN SYNCHRONOUS REPLICATION

(71) Applicant: VAST DATA LTD., Tel Aviv (IL)

(72) Inventor: Avi Goren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 125 days.

(21) Appl. No.: 18/341,733

(22) Filed: Jun. 26, 2023

(51) Int. Cl.
   *G06F 11/16* (2006.01)
   *G06F 11/14* (2006.01)
   *G06F 11/20* (2006.01)
   *G06F 16/178* (2019.01)
   *G06F 16/27* (2019.01)

(52) U.S. Cl.
   CPC ...... *G06F 11/1679* (2013.01); *G06F 11/1451* (2013.01); *G06F 11/2069* (2013.01); *G06F 16/178* (2019.01); *G06F 16/275* (2019.01); *G06F 11/2038* (2013.01); *G06F 11/2097* (2013.01)

(58) Field of Classification Search
   CPC ... G06F 11/1679; G06F 16/275; G06F 16/178
   See application file for complete search history.

(56) References Cited

U.S. PATENT DOCUMENTS

| | | | |
|---|---|---|---|
| 11,194,506 B1 * | 12/2021 | Proulx | G06F 3/0655 |
| 12,181,981 B1 * | 12/2024 | Heidemeyer | G06F 11/1469 |
| 2018/0260125 A1 * | 9/2018 | Botes | G06F 11/2094 |
| 2022/0027051 A1 * | 1/2022 | Kant | G06F 3/0617 |
| 2023/0137525 A1 * | 5/2023 | Karr | G06F 3/067 |
| | | | 711/162 |

* cited by examiner

*Primary Examiner* — Courtney Harmon
(74) *Attorney, Agent, or Firm* — Reches Patents

(57) ABSTRACT

A method for time-aligning data sent from a first storage system to a second storage system, the method includes (i) receiving multiple data units and a synchronization message, by a controller of the second storage system (SSS) and while applying a synchronous replication scheme; the multiple data units comprise first snapshot (S1) data units and second snapshot (S2) data units; the synchronization message indicates that a controller of the FSS has changed an allocation of data units from the S1 to the S2; and (ii) associating SSS timestamps with the multiple data units, wherein the associating of the SSS timestamps includes (a) associating a SSS timestamp related to the S1 for each S1 data unit, regardless a timing relationship between a time of reception of the synchronization message and a time of reception of the S1 data unit; and (b) delaying an association of a SSS timestamp related to the S2 for each S2 data unit, until receiving the synchronization message.

18 Claims, 4 Drawing Sheets

SYNCHRONIZED SNAPSHOT IN SYNCHRONOUS REPLICATION

BACKGROUND

Synchronous replication is a process that writes data to the primary storage system and the secondary (replica) storage system almost simultaneously. Therefore, the primary copy and the replica always remain synchronized. Acknowledgement is provided back to a client that sent the incoming write request only after the data is safely written to both the primary and the secondary storage systems.

In asynchronous replication, a bulk of changed data is sent periodically to the secondary storage system, rather than being sent upon each change. Asynchronous replication utilizes snapshots for synchronizing a point in time between the primary storage system and the secondary storage system. Upon each replication cycle, a snapshot is taken at the primary storage system to capture an image of the storage to be synchronized during the cycle, the changed data (comparing to a previous snapshot) is identified, and sent to the secondary storage system. When the replication cycle is completed, the remote storage system takes a snapshot, which matches the snapshot that was taken at the primary storage system.

Synchronous replication does not create or rely upon consistent snapshots for updating the second storage system, and thus such consistent point in time snapshots may not be available upon recovery of the replication connectivity between the primary and the secondary storage systems.

There is a need to provide a synchronized snapshot between the primary and the secondary storage systems, to allow reverting one or both of the storage systems to a synchronized version.

SUMMARY

There may be provided a method, system and a non-transitory computer readable medium for time-aligning data units.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
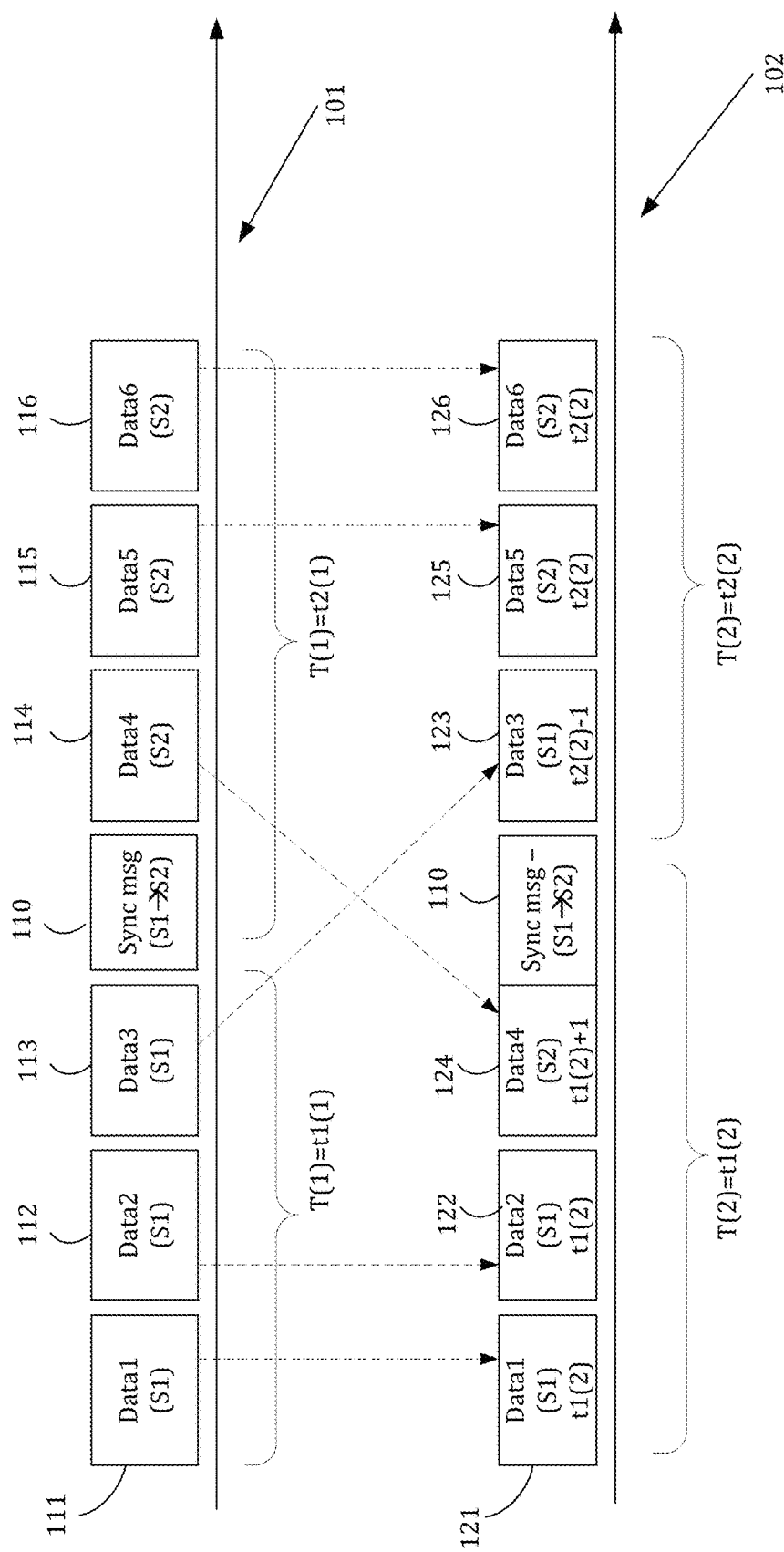
FIG. 1 is an example of a timing diagram.

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A first storage system and a second storage system are engaged in a synchronous replication for replicating a storage entity (a file, a directory, a filesystem sub-tree, a volume, a database table, etc.) from the first storage system to the second storage system. Each of the systems has its own system clock that is used for stamping written data, and to mark versions and snapshots. The system clock is advanced periodically. The first storage system's clock is not synchronized with the second storage system's clock, and may even be advanced in a different frequency.

In order to associate written data to a snapshot, upon writing, each piece of data is stamped with the value of the system clock of the local storage system. When a snapshot is declared at a certain value of the system clock, the data that is associated with this snapshot is determined according to the data time stamps and the points in time of the previous snapshots. This is done particularly to data that is not replicated. For data of replicated storage entities, the following methods are performed.

Once in a while, the first storage system may decide to mark a synchronized point in time (that defines a synchronized snapshot) between the two systems, that represents an identical snapshot of the replicated storage entity in both systems, and will be served upon recovery as a start point for sending updates from the system that was active during the failure to the system that is recovered.

For example, suppose the first storage system fails and the second storage system continues to handle user's write requests-when the first system is recovered, it reverts the content of the storage entity to the content that existed at the last synchronized point in time, and the second storage system starts sending the differences from the last synchronized point in time. A similar process takes place when the second storage system fails and the first storage system continues to handle user's write requests-when the second system is recovered, it reverts the content of the storage entity to the content that existed at the last synchronized point in time, and starts receiving the differences from the last synchronized point in time, sent by the first storage system. It may happen that the replication connection was failed, and both systems continued writing data in parallel. In this case, when the communication is recovered, each system may send to the other side the changes since the last synchronized point in time.

When the first storage system decides to set a synchronized point in time, the following steps take place. The first system saves the value of the current system clock as a synchronized point in time. The first system may assign a global tag to the newly created synchronized point in time for uniquely identifying the synchronized point in time, by both systems, in a case where more than one synchronized points in time need to be maintain. The global tag may be a snapshot identifier that is known to both systems. If only one synchronized point in time is required at a given time, then the value of the current system clock is saved without being associated with a global tag.

After defining the synchronized point in time, the first system clock (the system clock of the first storage system) is incremented, so as to distinguish newly written data (data written after the synchronized point in time) from data that was written on or before the synchronized point in time.

Then, the first storage system sends a synchronization message to the second storage system, announcing the new synchronized point in time. Since the clocks of the two systems are different and may represent different values at the same time, the synchronization message may not include a time value, but may optionally include the global tag. Alternatively, the synchronization message may just announce the setting of the synchronized point in time without further parameters, particularly when only one synchronized point in time is needed, at a time.

Since messages (that includes data or synchronization) are received out of order at the second storage system, there is a need to distinguish data that was sent from the first storage system prior to the setting of the synchronized point in time, from data that was sent after the setting.

Any data, that is sent from the first storage system after the sending of the synchronization message, is tagged by the first storage system, with an indication about belonging to a time that follows the synchronized point in time. The indication may be a general indication (e.g., a boolean value, where '1'—indicates data that belong to a new period, that follows the synchronized point in time, where '0'—indicates data sent before or at the synchronized point in time). The general indication that is set to indicate a post synchronization data, maybe reset after a while, when it can be assumed that all prior synchronization data was already processed by the second storage system.

Alternatively, the indication may include a snapshot identifier that is incremented each time a synchronized point in time is defined. For example: data that was sent after the sending of the synchronization message is tagged with a snapshot_identifier=S2, where older sent data was tagged with snapshot_identifier=S1.

When the second storage system receives the synchronization message, it saves the current value of the second system clock (the local system clock of the second storage system) as a synchronized point in time. The second system may associate the received global tag to the time defined for the newly created synchronized point in time. If only one synchronized point in time is required at a given time, then the value of the current second system clock is saved without being associated with a global tag.

Then, the second storage system advances the second system clock, to distinguish the synchronized point in time from the following time.

The second storage system may receive the synchronization message out of order, i.e., it may receive the synchronization message after receiving data that belongs to a time that follows the synchronized point in time, or it may receive the synchronization message before it receives data that belong to a time that preceded the synchronized point in time.

The second storage system stamps the time of each received data not only according to the second system clock, as being done to non-replicated data, but also by taking into consideration the indication that was applied by the first storage system to indicate whether the data belong to a time before or after the synchronized point in time, where this indication, along with the current state of the synchronization report (whether the corresponding synchronization message was already received or not)—determines whether the data needs to be stamp according to the current value of the second system clock, according to an adjusted value of the second system clock, or whether the time stamping of the data should be postponed, due to an unknown local time that should be associated with the non-yet-received synchronization message.

FIG. 1 illustrates a timeline 101 of the first storage system and a timeline 102 of the second storage system. The first storage system sent threes data units: data1 111, data2 112, and data3 113, when the first system clock T(1) of the first storage system has the value t1(1). The first three data units are sent with an indication of a pre-synchronization data, or in this case, a tag indicating snapshot_identifier=S1, indicating that the data preceded the first synchronized point in time.

Then the first storage system sends a synchronization message 110 and advances the first system clock T(1) from t1(1) to t2(1). The synchronization message 110 may optionally include an indication regarding an identifier of the synchronized point in time, e.g., S1, which is the snapshot to be sealed, or an indication about transitioning from S1 to S2, or may not include any parameter.

Next, the first storage system sends another three data units: data4 114, data5 115, and data6 116, that are tagged as post-synchronization data, i.e., an indication indicating the data belong to a time that succeeds the synchronized point in time. In this example, the indication is a new snapshot_identifier, e.g., S2, that will be sealed in the next synchronized point in time.

Timeline 102 of the second storage system illustrates the order in which the six data units and the synchronization message 110 are received at the second storage system. When the second system clock, T(2), of the second storage system has the value t1(2), the data units data1 121, data2 122 and data4 124 are received. Then the synchronization message 110 is received, causing the second system clock to advance to t2(2). Then data3 123, data5 125 and data6 126 are received.

When synchronization message 110 is received at the second storage system, the second storage system saves the current value of the second system clock as the recent synchronized point in time, and then advances the second system clock, so as to distinguish the data that belongs to a time before the synchronization from data that belongs to a post synchronization time. If there is a need to keep multiple synchronized points in time, and synchronization message 110 includes an identifier of the synchronized point in time, then the second storage system stores a list of synchronized points in time, where each is a pair that maps a local time to an identifier of a synchronized point in time, for example: [t1(2): S1], meaning that the synchronized point in time that seals content belongs to a snapshot and identified as S1 corresponds to the local time t1(2).

Each time the local system clock is advance in response to a new synchronized point in time, the current snapshot identifier may be incremented, by both systems.

Upon reception, the data units are saved in a temporary storage along with a timestamp that is derived from the current value of the second system clock, but may also depend on a match or mismatch between the tags attached to the data units, e.g., the snapshot identifier, and the synchronized state known to the second storage system, the current snapshot identifier known to the second storage system.

If there is a match between the snapshot identifier known to the second storage system and the snapshot identifier that tags of the received data, then the received data is stamped with the current value of the second system clock, replacing the tag that was placed by the first storage system.

In this example, in FIG. 1, data1 121 (that corresponds to data1 111) and data2 122 that are tagged with snapshot_identifier=S1, which also matches the recent snapshot known to the second storage system. Therefore, these data units are stamped, upon reception, with the current value of the second system clock, which is t1(2).

Data5 125 and data6 126 that are tagged with the new snapshot identifier,S2, and received after the reception of the synchronization message 110, which incremented the snapshot identifier known to the second storage system to S2, and therefore, data5 125 and data6 126 are stamped, upon reception, with the current value of the second system clock, which is now t2(2).

If the received data is tagged with a previous snapshot that is older than the current snapshot known to the second storage system, then the received data is stamped with the value of the second system clock that was saved in association with the last synchronized point in time. According to a simple case of the illustrated example of FIG. 1, the received data is stamped with the previous value of the second system clock, e.g., t2(2)–1, or in other words t2(1).

If the received data is tagged with a new snapshot, that is not yet known to the second storage system, then the stamping of the received data is postponed as long as the tagged snapshot of this received data is smaller than the snapshot known to the second storage system, or in other words, until a reception of a synchronization message that will cause the snapshot known to the second storage system to increase to the snapshot value of the tagged data.

Data4 124 is received out of order, before the reception of the synchronization message 110. Therefore, the tag of data4, snapshot_identifier=S2, is not yet known. Since the second storage system does not recognize this snapshot tag, it cannot determine the local time for stamping data4. Therefore, the stamping is postponed until the synchronization message is received and causes the snapshot identifier to increase to S2, which matches the snapshot identifier that tags data4. Then, data4 can be stamped with the second system clock, which is also incremented upon receiving the synchronization message.

Data3 123 is received out of order, after the reception of the synchronization message 110. Data3 123 is tagged with a previous snapshot identifier, S1, while the current snapshot identifier known to the second storage system is S2. The second storage system stamps data3 123 with a previous value of the second system clock that corresponds to the time before receiving the synchronization message.

Figure 2:
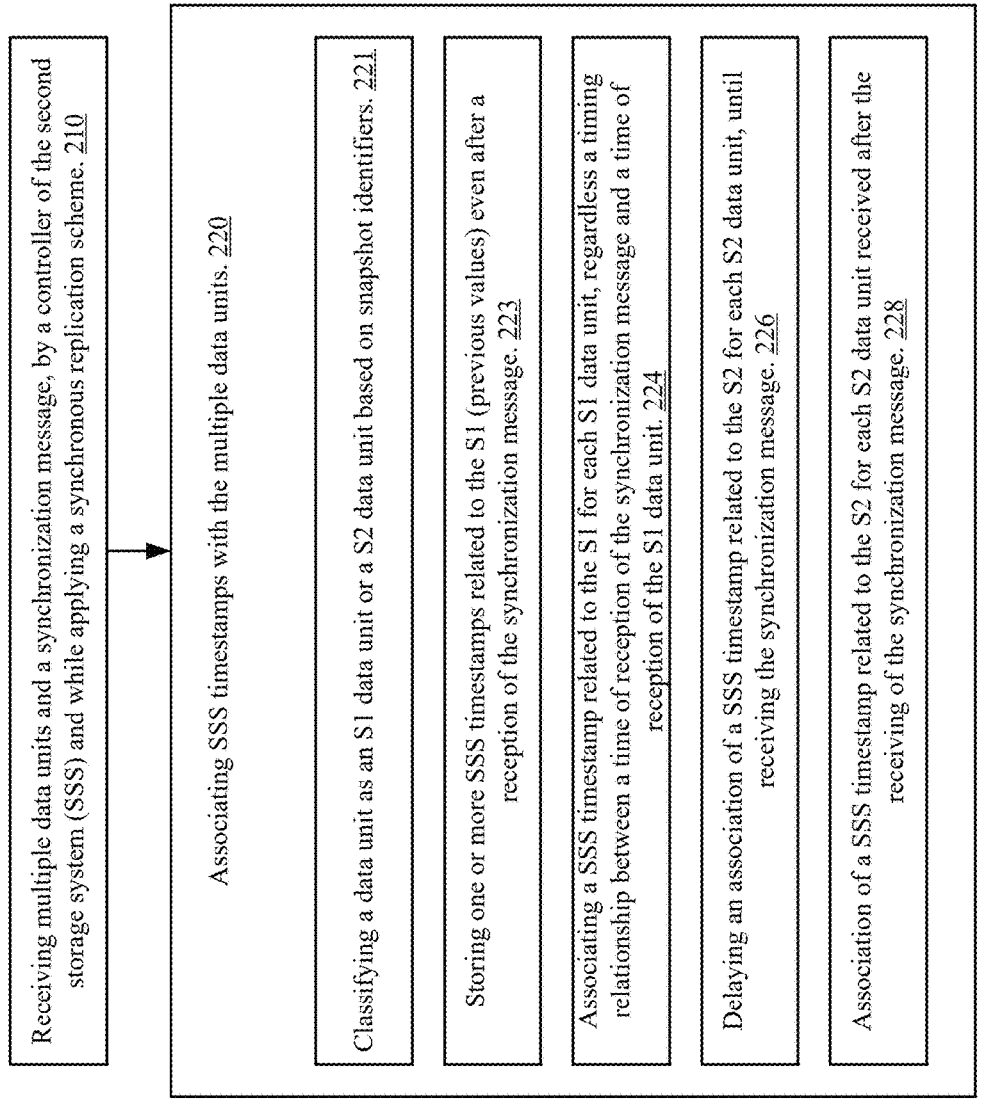
FIG. 2 is an example of a method.

FIG. 2 illustrates an example of method 200 for time-aligning data sent from a first storage system (FSS) to a second storage system (SSS). The time alignment includes associating data units to the same (synchronized) snapshot—in the SSS and in the FSS-even when the SSS and the FSS are not mutually synchronized—even when a FSS clock and a SSS clock are not synchronized. The SSS clock is used to generate SSS time stamps. The FSS clock is used to generate FSS timestamps. Each system, FSS and SSS, may also generate its own local snapshots, at a separate schedule, in addition to the synchronized snapshot.

Method 200 is executed by a controller of a second storage system.

Method 200 may start by step 210 of receiving multiple data units and a synchronization message, by a controller of the second storage system (SSS) and while applying a synchronous replication scheme for replicating the multiple data units from the FSS to the SSS.

The reception of the multiple data units and the synchronization message may be in order or may be out of order. Method 200 solves out of order scenarios. In an ordered scenario, the order of reception of the multiple data units and the synchronization message is the same order as the order of transmission (or generation), by the FSS, of the multiple data units and the synchronization message.

For example—assuming that the multiple data units includes first snapshot (S1) data units and second snapshot (S2) data units. The first snapshot (S1) data units are data units that are tagged with the indication S1, while the second snapshot (S2) data units are data units that are tagged with the indication S2.

An ordered reception of the multiple data units and the synchronization message will include receiving the S1 data units (according to their order), then-receiving the synchronization message, and finally receiving the S2 data units (according to their order).

An out of order scenario may include, for example, receiving the synchronization message before receiving all the S1 data units and/or receiving the synchronization message after receiving one or more S2 data units.

The synchronization message indicates that a controller of the FSS has changed an allocation of data units from the S1 to the S2, and that S1 should be sealed as a synchronized snapshot representing a synchronized point in time between the two systems.

According to an embodiment, step 210 is followed by step 220 of associating SSS timestamps with the multiple data units.

According to an embodiment-step 220 includes step 223 of storing one or more SSS timestamps (in association with the data units) related to the S1 (previous values) even after a reception of the synchronization message. In response to the reception of the synchronization message, the SSS advances the SSS clock, to indicate time values from now on (until a further synchronization message) that are related to S2. Therefore the SSS timestamps related to S1 are timestamps that are smaller than the advanced value of the SSS clock. This may happen in one of these scenarios: (i) before the reception of the synchronization message, the SSS timestamps for stamping S1 data units (tagged as S1), are derived from the current value of the SSS clock, which is not yet advanced; (ii) after the reception and the handling of the synchronization message, when handling out of order S1 data units, the time being used for stamping is the time associated with the time of sealing S1, i.e., the time before the advancement of the SSS clock in response to the synchronization message.

According to an embodiment, step 220 includes step 224 of associating a SSS timestamp related to the S1 for each S1 data unit, regardless a timing relationship between a time of reception of the synchronization message and a time of reception of the S1 data unit. When an S1 data unit is received before a reception of the synchronization message—then step 222 may include assigning the current value of the SSS clock. When an S1 data unit is received after a reception of the synchronization message—then step 224 may include assigning a previous value of the SSS clock—a value that does not exceed the value of the SSS clock at the time of reception of the synchronization message. Step 224 may include using the one or more (previous) SSS timestamp for associating a SSS timestamp of a S1 data unit that was received by the controller of the SSS after a reception of the synchronization message.

According to an embodiment, step 220 includes step 226 of delaying an association of a SSS timestamp related to the S2 for each S2 data unit, until receiving the synchronization message that indicates a transition to S2. If a S2 data unit is received by the controller of the SSS, before the controller of the SSS receives the synchronization message, the controller of the SSS has to wait till it receives the synchronization message that informs the controller of the SSS that the controller of the FSS has changed an allocation of data units from the S1 to the S2. In this scenario, the controller of the SSS may not know what is the meaning of a S2 identifier that is associated with the S2 data unit. The S2 data unit may be buffered or temporarily stored until the controller of the SSS receives the synchronization message.

According to an embodiment, step 220 includes step 228 of association of a SSS timestamp related to the S2 for each S2 data unit received after the receiving of the synchronization message. The SSS timestamp related to the S2, is a timestamp that is equal or larger than the advanced value of the SSS clock that was set in response to receiving the synchronization message, or in other words-a timestamp that is larger than the value of the SSS clock that sealed the S1 snapshot (before advancing the clock). When the S2 data unit is received in order, i.e., after the synchronization message, then the timestamp is just derived or taken from the current value of the SSS clock. When the S2 data unit is received out of order, i.e., before the synchronization message, then the stamping is suspended until after the reception of the synchronization message, and then the timestamp can be just derived or taken from the current value of the SSS clock, which has now a value that is larger than the time of the sealed previous snapshot S1.

According to an embodiment, step 220 includes step 221 of classifying a data unit as an S1 data unit or a S2 data unit based on snapshot identifiers. A S1 data unit is associated with a S1 snapshot identifier. A S2 data unit is associated with a S2 snapshot identifier. The identification of the S2 data units as being associated with the S2 may follow a reception of the synchronization message and based on the S2 identifier.

The S1 identifier and/or the S2 identifier may be a single-digit binary S1 identifier—which may provide a differentiation between two different snapshots.

The S1 identifier and/or the S2 identifier may be a multiple-digit binary S1 identifier—which may provide a differentiation between more than two different snapshots.

Method 200 may be applicable to any number of snapshots—associated with any number of snapshot identifiers.

Method 200 may be repeated multiple times—for different snapshots.

Method 200 may include step 250 of receiving a request to revert to the S1, and reverting to the S1, by the controller of the SSS, based on SSS timestamps associated with the S1. The reverting may take place, when the SSS recovers from a failure, where the failure occurred after receiving the synchronization message about the transitioning from S1 to S2 and further receiving part of the S2 data units, while S2 was not yet sealed (i.e., no synchronization message was received to seal S2 and to announce transitioning to a further snapshot). The FSS has proceeded with handling writes after SSS failed, and needs to synchronize the SSS with the new updates, but on a base of a last synchronized snapshot, which is S1.

Figure 3:
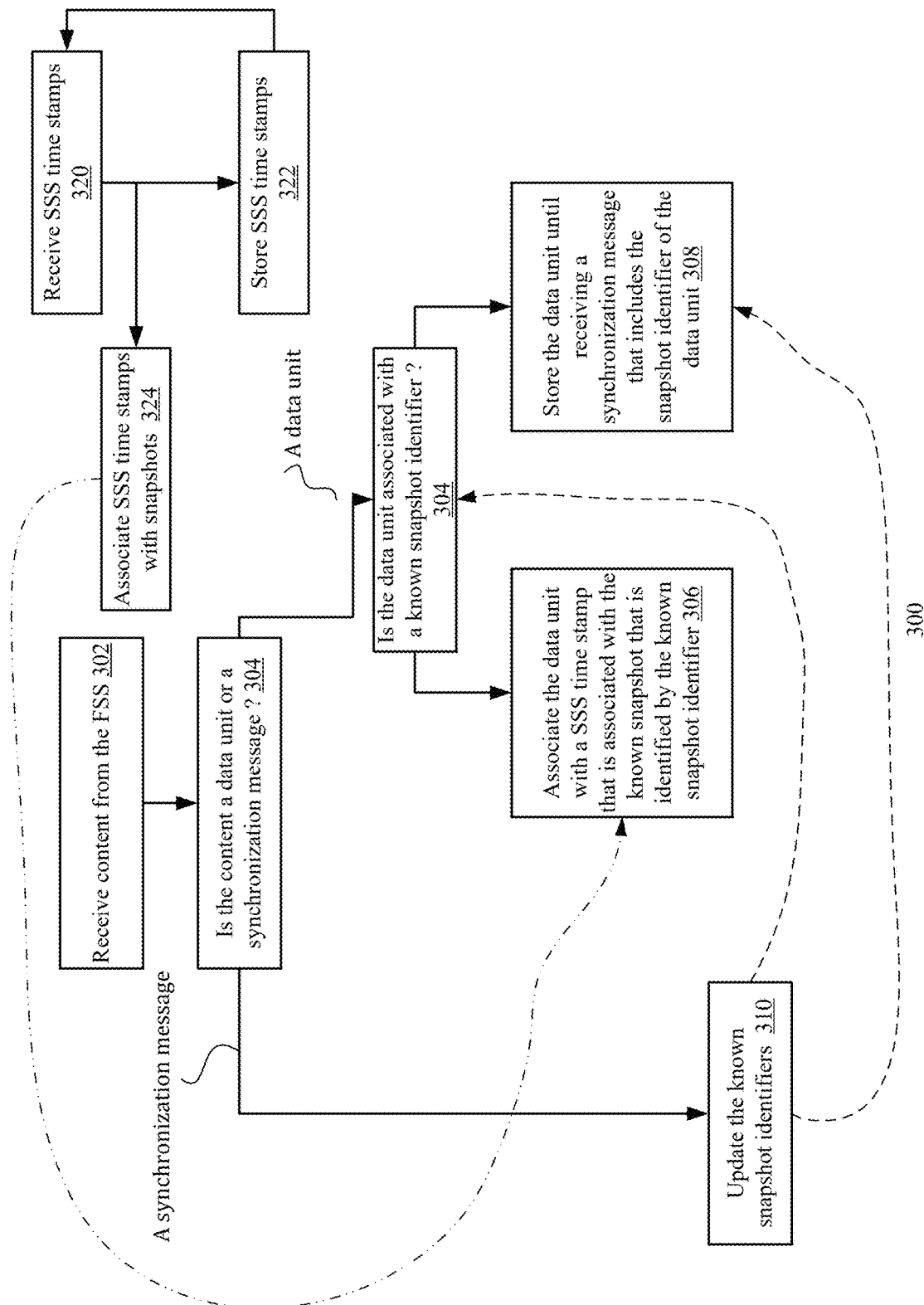
FIG. 3 is an example of a method.

FIG. 3 illustrates a method 300 for time-aligning data sent from a FSS to a SSS. The time alignment includes associating data units to the same snapshot—in the SSS and in the FSS—even when the SSS and the FSS are not mutually synchronized—even when a FSS clock and a SSS clock are not synchronized. The SSS clock is used to generate SSS time stamps. The FSS clock is used to generate FSS timestamps.

Method 300 is executed by a controller of a second storage system.

According to an embodiment, method 300 includes step 320 of obtaining SSS time stamps. Step 320 is followed by step 322 of storing the SSS time stamps that represents a synchronized point in time (snapshot) between the FSS and the SSS, and by step 324 of associating SSS time stamps with snapshots 324.

According to an embodiment, method 300 also includes step 302 of receiving content from the FSS. Step 302 is followed by step 304 of checking if the content is a data unit or a synchronization message.

When the content is a synchronization message—step 304 is followed by step 310 of moving to a new snapshot and adding a new snapshot identifier to the known snapshot identifiers—for example—learning the snapshot identifier of S2, and further associating the snapshot identifier with the value of the SSS clock at the time of receiving the synchronization message. The moving to a new snapshot further includes advancing the SSS clock.

When the content is a data unit—step 304 is followed by step 304 of checking whether the data unit is associated with a known snapshot identifier.

When the data unit is associated with a known snapshot identifier—step 304 is followed by step 306 of associating the data unit with a SSS time stamp that is associated with the known snapshot that is identified by the known snapshot identifier.

When the data unit is associated with an unknown snapshot identifier—step 304 is followed by step 308 of delaying the association with a SSS timestamp until receiving a synchronization message that indicates a transition to a new snapshot having the snapshot identifier that tags the data unit.

Figure 4:
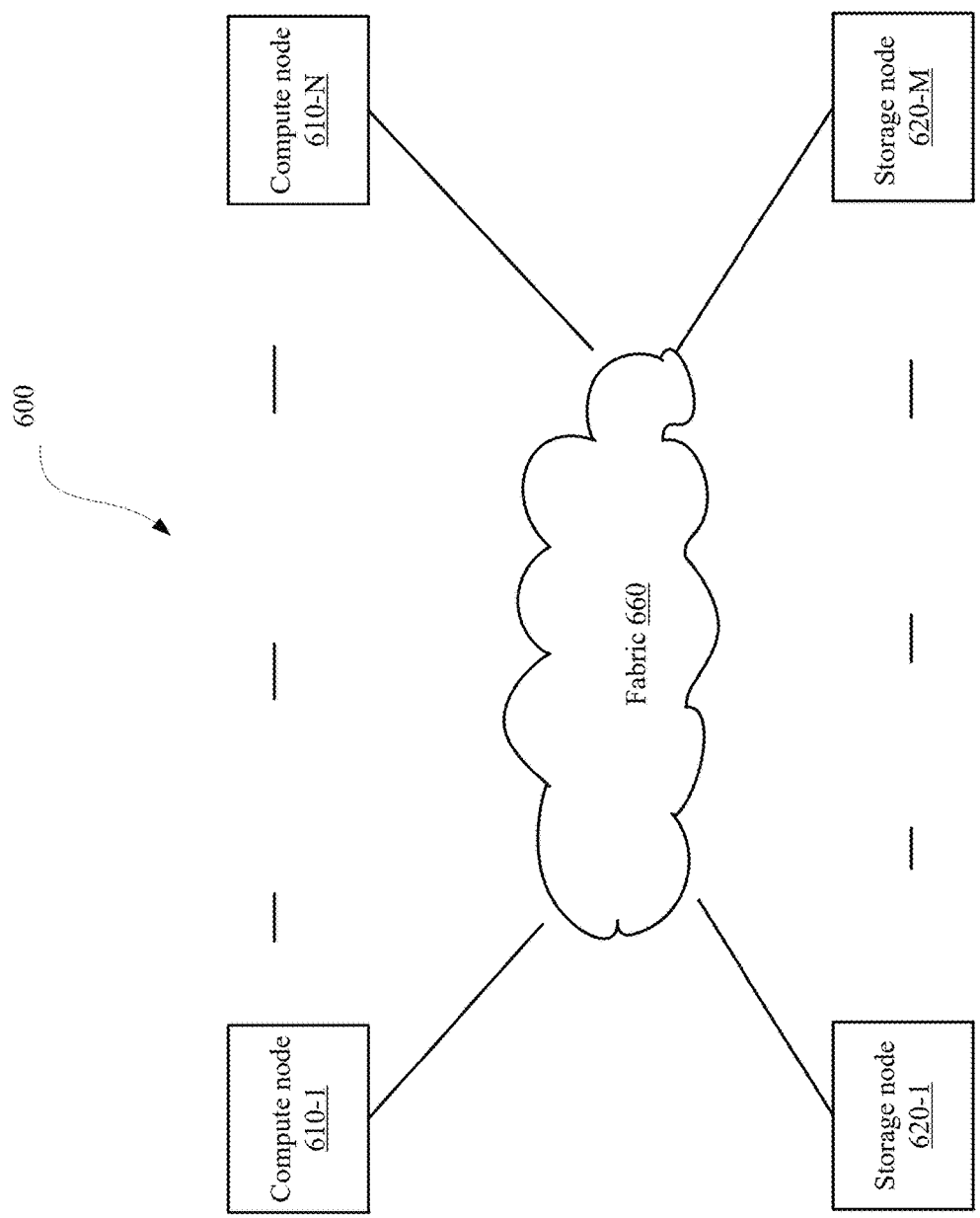
FIG. 4 is an example of a system.

FIG. 4 illustrates an example of a storage system 600. Both the first storage system and the second storage system may have the structure of storage system 600 or may have a similar structure.

The storage system 600 includes a number of N compute nodes 610-1 through 610-N). The compute nodes include multiple compute cores, where each compute core can be a processing circuitry, a part of processing circuitry, a controller (hardware controller) and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 600 also includes a number of M storage nodes 620-1 through 620-M, and includes the storage devices for storing data, stored entities, replicated data, snapshot information, and particularly mapping of synchronized snapshot identifiers and the corresponding SSS or FSS time.

The computer nodes 610 and the storage nodes 620 are connected through a communication fabric 660. M may equal N or may differ from N. Multiple of the compute nodes or one of the compute nodes may execute method 200 and/or 300.

The FSS and SSS are connected to each other via a network that is different from fabric 660, for the purpose of communicating the replication messages and data.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for time-aligning data sent from a first storage system (FSS) to a second storage system, the method comprises:
    receiving multiple data units and a synchronization message, by a controller of the second storage system (SSS) and while applying a synchronous replication scheme:
        wherein the multiple data units comprise first snapshot (S1) data units and second snapshot (S2) data units;
        wherein the synchronization message indicates that a controller of the FSS has changed an allocation of data units from the S1 to the S2;

wherein the receiving of the S1 data units, the S2 data units and the synchronization message is performed regardless of an order of transmitting the S1 data units, the S2 data units and the synchronization message from the FSS; and associating SSS timestamps with the multiple data units: wherein the associating of the SSS timestamps comprises:

(a) associating a first SSS timestamp related to the S1 for each S1 data unit, regardless a timing order between a time of reception of the synchronization message and a time of reception of the S1 data unit, wherein a value of the first SSS timestamp does not exceed a value of a SSS clock upon reception of the synchronization message; and (b) delaying an association of a second SSS timestamp related to the S2 for each S2 data unit that is received before the synchronization message, and associating, after receiving the synchronization message, the second SSS timestamp to each S2 data unit whose association has been delayed, wherein a value of the second SSS timestamp is larger than the value of the SSS clock upon reception of the synchronization message.

2. The method according to claim 1, wherein the S1 data units are associated with a S1 identifier, wherein the method comprises identifying the S1 data units based on the S1 identifier.

3. The method according to claim 2, wherein the S2 data units are associated with a S2 identifier, wherein the method comprises identifying the S2 data units following a reception of the synchronization message and based on the S2 identifier.

4. The method according to claim 2 wherein the S1 identifier is a single-digit binary S1 identifier.

5. The method according to claim 2 wherein the S1 identifier is a multiple-digit binary S1 identifier.

6. The method according to claim 1, wherein the FSS comprises a FSS clock, the SSS comprises an SSS clock, wherein the SSS clock and the FSS clock are not synchronized, wherein the SSS timestamps are generated using the SSS clock.

7. The method according to claim 1 comprising receiving a request to revert to the S1, and reverting to the S1, by the controller of the SSS, based on SSS timestamps associated with the S1.

8. The method according to claim 1, comprising storing one or more SSS timestamps related to the S1 even after a reception of the synchronization message.

9. The method according to claim 8 comprising using the one or more stored SSS timestamp for associating a SSS timestamp of a S1 data unit that was received by the controller of the SSS after a reception of the synchronization message.

10. A non-transitory computer readable medium for time-aligning data sent from a first storage system (FSS) to a second storage system, the non-transitory computer readable medium stores instructions for:

receiving multiple data units and a synchronization message, by a controller of the second storage system (SSS) and while applying a synchronous replication scheme: wherein the multiple data units comprise first snapshot (S1) data units and second snapshot (S2) data units;

wherein the synchronization message indicates that a controller of the FSS has changed an allocation of data units from the S1 to the S2;

wherein the receiving of the S1 data units, the S2 data units and the synchronization message is performed regardless of an order of transmitting the S1 data units, the S2 data units and the synchronization message from the FSS; and associating SSS timestamps with the multiple data units: wherein the associating of the SSS timestamps comprises:

(c) associating a first SSS timestamp related to the S1 for each S1 data unit, regardless a timing order between a time of reception of the synchronization message and a time of reception of the S1 data unit, wherein a value of the first SSS timestamp does not exceed a value of a SSS clock upon reception of the synchronization message; and (d) delaying an association of a second SSS timestamp related to the S2 for each S2 data unit that is received before the synchronization message, and associating, after receiving the synchronization message, the second SSS timestamp to each S2 data unit whose association has been delayed, wherein a value of the second SSS timestamp is larger than the a value of the SSS clock upon reception of the synchronization message.

11. The non-transitory computer readable medium according to claim 10, wherein the S1 data units are associated with a S1 identifier, wherein the non-transitory computer readable medium comprises identifying the S1 data units based on the S1 identifier.

12. The non-transitory computer readable medium according to claim 11, wherein the S2 data units are associated with a S2 identifier, wherein the non-transitory computer readable medium comprises identifying the S2 data units following a reception of the synchronization message and based on the S2 identifier.

13. The non-transitory computer readable medium according to claim 11, wherein the S1 identifier is a single-digit binary S1 identifier.

14. The non-transitory computer readable medium according to claim 11, wherein the S1 identifier is a multiple-digit binary S1 identifier.

15. The non-transitory computer readable medium according to claim 10, wherein the FSS comprises a FSS clock, the SSS comprises an SSS clock, wherein the SSS clock and the FSS clock are not synchronized, wherein the SSS timestamps are generated using the SSS clock.

16. The non-transitory computer readable medium according to claim 10, that stores instructions for receiving a request to revert to the S1, and reverting to the S1, by the controller of the SSS, based on SSS timestamps associated with the S1.

17. The non-transitory computer readable medium according to claim 10, that stores instructions for storing one or more SSS timestamps related to the S1 even after a reception of the synchronization message.

18. The non-transitory computer readable medium according to claim 17, that stores instructions for using the one or more stored SSS timestamp for associating a SSS timestamp of a S1 data unit that was received by the controller of the SSS after a reception of the synchronization message.

* * * * *